US011302963B2

United States Patent
Shi et al.

(10) Patent No.: US 11,302,963 B2
(45) Date of Patent: Apr. 12, 2022

(54) NON-AQUEOUS ELECTROLYTE FOR LITHIUM ION BATTERY AND LITHIUM ION BATTERY

(71) Applicant: SHENZHEN CAPCHEM TECHNOLOGY CO., LTD., Guangdong (CN)

(72) Inventors: Qiao Shi, Guangdong (CN); Chang'an Zeng, Guangdong (CN); Muchong Lin, Guangdong (CN)

(73) Assignee: SHENZHEN CAPCHEM TECHNOLOGY CO., LTD., Shenzhen (CN)

( * ) Notice: Subject to any disclaimer, the term of this patent is extended or adjusted under 35 U.S.C. 154(b) by 132 days.

(21) Appl. No.: 16/490,897

(22) PCT Filed: Jun. 21, 2017

(86) PCT No.: PCT/CN2017/089389
§ 371 (c)(1),
(2) Date: Sep. 4, 2019

(87) PCT Pub. No.: WO2018/196139
PCT Pub. Date: Nov. 1, 2018

(65) Prior Publication Data
US 2020/0020983 A1 Jan. 16, 2020

(30) Foreign Application Priority Data
Apr. 28, 2017 (CN) .......... 201710297451.X

(51) Int. Cl.
*H01M 10/0567* (2010.01)
*H01M 10/0525* (2010.01)
*H01M 10/42* (2006.01)
*H01M 10/0568* (2010.01)

(52) U.S. Cl.
CPC ... *H01M 10/0567* (2013.01); *H01M 10/0525* (2013.01); *H01M 10/4235* (2013.01); *H01M 10/0568* (2013.01); *H01M 2300/0025* (2013.01)

(58) Field of Classification Search
CPC ......... H01M 10/0567; H01M 10/0525; H01M 10/4235; H01M 10/0569; H01M 10/0568; H01M 10/0566; H01M 2300/0025; H01M 2300/0037; H01M 4/131
See application file for complete search history.

(56) References Cited

U.S. PATENT DOCUMENTS

| 3,663,569 | A | 5/1972 | Lew |
| 6,174,629 | B1 | 1/2001 | Gan et al. |
| 2013/0337341 | A1* | 12/2013 | Tikhonov ......... H01M 10/0568 429/326 |
| 2016/0301104 | A1* | 10/2016 | Shi ............... H01M 4/525 |

FOREIGN PATENT DOCUMENTS

| CN | 1495959 A | 5/2004 |
| CN | 102195076 A | 9/2011 |
| CN | 103151559 A | 6/2013 |
| CN | 103354962 A | 10/2013 |
| CN | 103441304 A | 12/2013 |
| CN | 103460496 A | 12/2013 |
| CN | 103594729 A | 2/2014 |
| CN | 104300174 A | 1/2015 |
| CN | 105051965 A | 11/2015 |
| CN | 105161763 A | 12/2015 |
| CN | 105580189 A | 5/2016 |
| CN | 105633461 A | 6/2016 |

(Continued)

OTHER PUBLICATIONS

McNaught et al., "Alkylenes," Feb. 24, 2014, IUPAC Compendium of Chemical Terminology "Gold Book." (Year: 2014).*
Libo Hu et al., Fluorinated electrolytes for 5-V Li-ion chemistry: Dramatic enhancement of LiNi0.5Mn1.5O4/graphite cell performance by a lithium reservoir, Electrochemistry Communications, Apr. 2014, vol. 44, pp. 34-37.
International Search Report of PCT Patent Application No. PCT/CN2017/089389 dated Jan. 29, 2018.

*Primary Examiner* — Matthew W Van Oudenaren

(57) ABSTRACT

In order to solve the problem of poor cycle performance (especially high temperature cycle performance) of the existing lithium ion battery electrolyte containing anhydride or anhydride derivatives, the disclosure provides a non-aqueous electrolyte for lithium ion battery. The non-aqueous electrolyte for lithium ion battery comprises a compound A represented by formula I and a compound B represented by formula II,

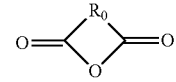

Formula I

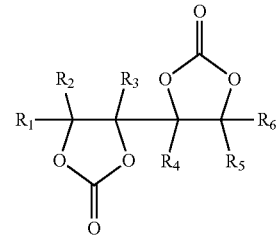

Formula II In the structural formula I, $R_0$ is C2-C4 alkylene or alkenylene, or C2-C4 fluoroalkylene or fluoroalkenylene; In formula II, $R_1$, $R_2$, $R_3$, $R_4$, $R_5$ and $R_6$ are each independently selected from one of hydrogen atom, fluorine atom and C1-C5 group. The non-aqueous electrolyte for lithium ion battery provided by the invention is obtained by combining the compound A and compound B, so that the lithium ion battery containing the non-aqueous electrolyte has better cycle performance and high-temperature storage performance.

9 Claims, No Drawings

(56) References Cited

FOREIGN PATENT DOCUMENTS

| | | | |
|---|---|---|---|
| CN | 105830270 | A | 8/2016 |
| CN | 106058317 | A | 10/2016 |
| CN | 106252639 | A | 12/2016 |
| CN | 106328996 | A | 1/2017 |
| CN | 106410272 | A | 2/2017 |
| GB | 1147540 | A | 4/1969 |
| JP | 2000260467 | A | 9/2000 |
| JP | 2006219406 | * | 8/2006 |
| JP | 2006219406 | A | 8/2006 |
| JP | 2014182951 | A | 9/2014 |
| JP | 2014525667 | A | 9/2014 |
| JP | 2015092476 | A | 5/2015 |
| WO | 2016025589 | A1 | 2/2016 |
| WO | WO2016049953 | * | 4/2016 |
| WO | 2016151983 | A1 | 9/2016 |

* cited by examiner

NON-AQUEOUS ELECTROLYTE FOR LITHIUM ION BATTERY AND LITHIUM ION BATTERY

TECHNICAL FIELD

The invention relates to the field of lithium ion batteries, more particularly, to a non-aqueous electrolyte for lithium ion battery and lithium ion battery.

BACKGROUND

A lithium ion battery is a secondary battery that works by the movement of lithium ions between the positive and negative electrodes. Lithium-ion batteries have the remarkable advantages of high working voltage, high energy density, low self-discharge rate and no memory effect. They are widely used in energy storage power supply systems such as hydraulic, thermal, wind and solar power stations, as well as in many fields such as electric tools, electric bicycles, electric motorcycles, electric vehicles, military equipment, aerospace and so on. With the rapid development of new energy vehicles and energy storage, people have put forward higher requirements for the performance of lithium ion power batteries. On the one hand, the battery needs to have higher mileage or longer service life, on the other hand, the battery needs to have better safety. This requires the development of safer lithium ion batteries with higher capacity. At present, the lithium ion power battery has the problem of inadequate high-temperature cycle life, and cannot give consideration to both high-temperature and low-temperature performances.

Non-aqueous electrolyte is the key factor that affects battery cycle life, as well as high and low temperature performances, especially additives in electrolyte, which play a decisive role in electrolyte performances. Currently, conventional film-forming additives such as vinylene carbonate (VC) are commonly used in practical non-aqueous electrolyte for lithium ion batteries. In order to ensure excellent cycle performance of the battery, especially to ensure long life, it is generally necessary to add more VC. However, too high VC content will deteriorate some of the battery's performances, for example, it is easy to generate gas during high-temperature storage, resulting in ballooning of the battery. Moreover, the high content of VC will obviously increase the interface impedance of the battery and deteriorate the low temperature performance of the battery. There are patents disclosing that anhydride or anhydride derivatives can form a coating based on the additive on the negative electrode during charging and discharging processes, thus inhibiting the decomposition of electrolyte. For negative electrode materials containing tin or silicon, anhydride or anhydride derivatives can also improve battery performances such as cycle and high temperature storage. However, the addition of anhydride or anhydride derivatives can cause poor low temperature performance of the battery due to its large impedance. Recent studies have found that the combination of VC and anhydride or anhydride derivatives can improve the cycle and storage performance to a certain extent, but the high-temperature storage and cycle performances, especially the high temperature cycle performance, still cannot meet the practical use requirements.

SUMMARY

The invention aims to provide a non-aqueous electrolyte for lithium ion battery with better low temperature performance and cycle performance, and aims to solve the problem of poor high-temperature storage and cycle performance (especially high temperature cycle performance) of the existing lithium ion battery electrolyte containing anhydride or anhydride derivatives.

The non-aqueous electrolyte for lithium ion battery provided by the present application, comprises a compound A represented by formula I and a compound B represented by formula II,

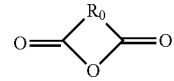

Formula I

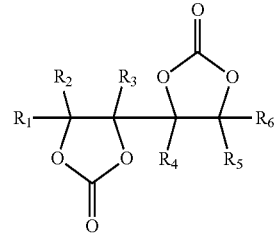

Formula II

In formula I, $R_0$ is C2-C4 alkylene or alkenylene, or C2-C4 fluoroalkylene or fluoroalkenylene;

In formula II, $R_1$, $R_2$, $R_3$, $R_4$, $R_5$ and $R_6$ are each independently selected from one of hydrogen atom, halogen atom and C1-C5 group.

Preferably, the C1-C5 group is selected from a C1-C5 hydrocarbon group, halogenated hydrocarbon group, oxygen-containing hydrocarbon group, silicon-containing hydrocarbon group, and cyano-substituted hydrocarbon group.

Preferably, $R_1$, $R_2$, $R_3$, $R_4$, $R_5$ and $R_6$ are each independently selected from one of hydrogen atom, fluorine atom, methyl group, ethyl group, methoxyl group, ethyoxyl group, triethylsiloxy group, cyano group and trifluoromethyl group.

Preferably, the compound B comprises one or more of compounds 1-9 represented by the following structural formulae,

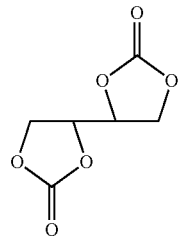

Compound 1

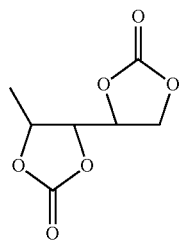

Compound 2

Compound 3
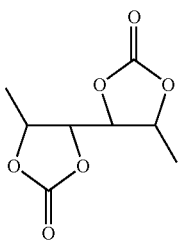

Compound 4
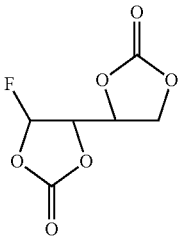

Compound 5
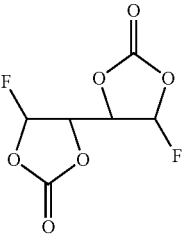

Compound 6
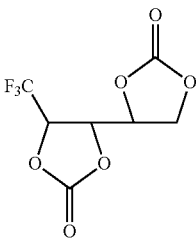

Compound 7
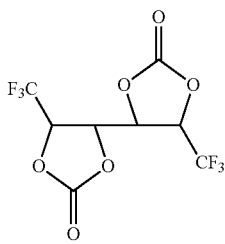

Compound 8
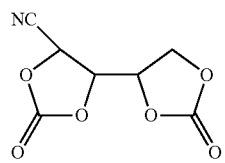

Compound 9
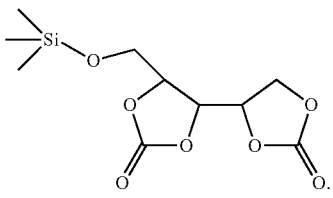

Preferably, the percentage mass content of the compound B is 0.1-5% based on the total mass of the non-aqueous electrolyte for lithium ion battery being 100%.

Preferably, the compound A is selected from one or more of succinic anhydride, maleic anhydride and 2-methylmaleic anhydride.

Further preferably, the percentage mass content of the compound A is 0.1-3% based on the total mass of the non-aqueous electrolyte for lithium ion battery being 100%.

Preferably, the lithium ion non-aqueous electrolyte further comprises at least one of unsaturated cyclic carbonate compounds, fluorine-substituted cyclic carbonate compounds, and sultone compounds.

More preferably, the unsaturated cyclic carbonate compound includes at least one of vinylene carbonate (VC) and vinyl ethylene carbonate (VEC). The fluorine-substituted cyclic carbonate compound includes fluoroethylene carbonate (FEC). The sultone compound is selected from at least one of 1,3-propane sultone (1,3-PS), 1,4-butane sultone (1,4-BS), and 1,3-propene sultone (PST).

Preferably, the non-aqueous electrolyte for lithium ion battery comprises a lithium salt selected from one or more of $LiPF_6$, $LiBF_4$, LiBOB, LiDFOB, $LiN(SO_2CF_3)_2$, $LiN(SO_2C_2F_5)_2$, $LiC(SO_2CF_3)_3$ and $LiN(SO_2F)_2$.

And, a lithium ion battery, comprises a positive electrode, a negative electrode, a separator interposed between the positive electrode and the negative electrode, and an electrolyte, wherein the electrolyte is the non-aqueous electrolyte for lithium ion battery.

The non-aqueous electrolyte for lithium ion battery provided by the invention contains both the compound A and compound B, which can effectively improve high-temperature storage performance and cycle performance of the battery, so that the lithium ion battery containing the non-aqueous electrolyte has better cycle performance and high-temperature storage performance. The lithium ion battery provided by the invention contains the non-aqueous electrolyte, so that the lithium ion battery has both better cycle performance and high-temperature storage performance.

DETAILED DESCRIPTION OF DISCLOSED EMBODIMENTS

In order to make the technical problems to be solved, technical solutions and beneficial effects more apparent and clearer, the present application will be described in further detail below with reference to embodiments. It should be understood that the specific embodiments described herein are only for the purpose of explaining the present invention and are not intended to limit the present invention.

The non-aqueous electrolyte for lithium ion battery provided by the present application, comprises a compound A represented by formula I and a compound B represented by formula II, Formula I

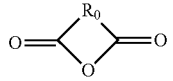

-continued

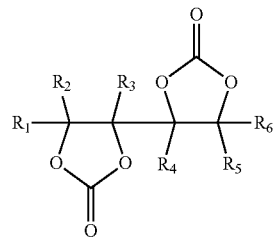

Formula II

In formula I, $R_0$ is C2-C4 alkylene or alkenylene, or C2-C4 fluoroalkylene or fluoroalkenylene;

In formula II, $R_1$, $R_2$, $R_3$, $R_4$, $R_5$ and $R_6$ are each independently selected from one of hydrogen atom, halogen atom and C1-C5 group.

In the embodiment of the invention, C2-C4 indicates that the number of carbon atoms is 2-4, similarly, C1-C5 indicates that the number of carbon atoms is 1-5.

Preferably, the compound A is selected from one or more of succinic anhydride, maleic anhydride and 2-methylmaleic anhydride, thereby being more beneficial to improving the high temperature performance of the lithium ion battery.

It is further preferred that the percentage mass content of the compound A is 0.1-3% based on the total mass of the non-aqueous electrolyte for lithium ion battery being 100%. When the percentage mass content of the compound A is less than 0.1%, the high temperature performance and cycle performance of the lithium ion battery are reduced, further affecting the practicability of the battery; When the percentage mass content of the compound A is higher than 3%, the film formation is relatively thick, the impedance is increased, and the high temperature performance and cycle performance of the lithium ion battery are also reduced.

The non-aqueous electrolyte for lithium ion battery provided by the embodiments of the invention contains a compound A shown in structural formula I, and the compound A can form a protective film on the negative electrode of the lithium ion battery to inhibit decomposition of the electrolyte, thereby improving high temperature performance and cycle performance of the battery. However, the cycle performance, especially the high temperature cycle performance, of the electrolyte obtained by using the compound A, or the combination of compound A and conventional electrolyte additives still cannot meet the use requirements.

Preferably, the C1-C5 group is selected from a C1-C5 hydrocarbon group, halogenated hydrocarbon group, oxygen-containing hydrocarbon group, silicon-containing hydrocarbon group, and cyano-substituted hydrocarbon group. Preferably, $R_1$, $R_2$, $R_3$, $R_4$, $R_5$ and $R_6$ are each independently selected from a hydrogen atom, fluorine atom, methyl group, ethyl group, methoxyl group, ethyoxyl group, triethylsiloxy group, cyano group or trifluoromethyl group.

Preferably, the compound B comprises one or more of compounds 1-9 represented by the following structural formulae,

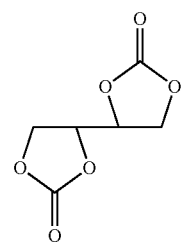

Compound 1

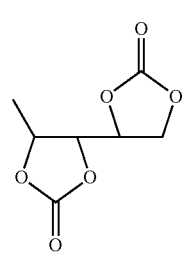

Compound 2

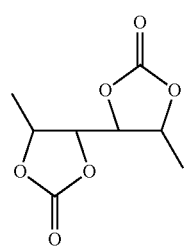

Compound 3

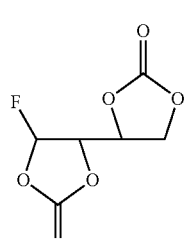

Compound 4

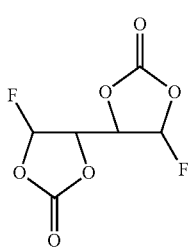

Compound 5

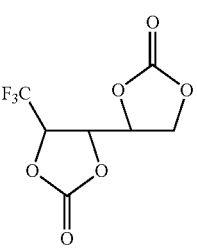

Compound 6

Compound 7

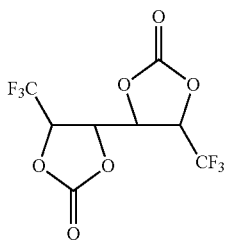

Compound 8

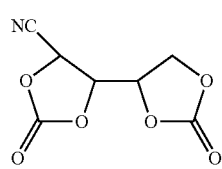

Compound 9

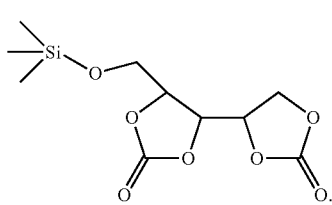

The preferred compound B can work better with the compound A, so that the lithium ion battery has excellent high temperature cycle performance, high-temperature storage performance and better low temperature performance.

The synthesis method of the compound B represented by formula I is conventional, for example, the compound B can be prepared by ester exchange reaction between polyol (such as erythritol, xylitol, etc.) and carbonate (such as dimethyl carbonate, diethyl carbonate, vinyl carbonate, etc.) in the presence of basic catalyst. An example of the synthetic route is as follows:

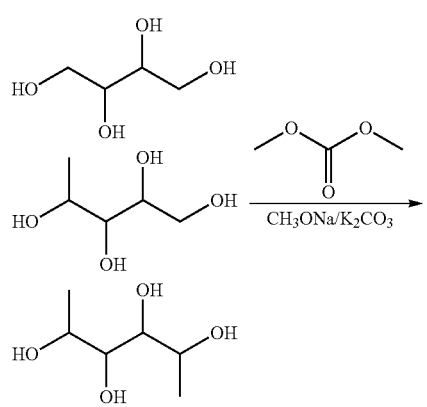

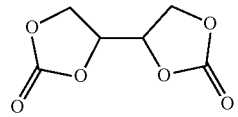

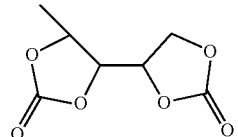

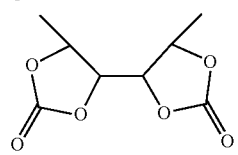

The fluorine-containing compound in compound B is prepared by: fluorinating the corresponding carbonate and mixture $F_2/N_2$, and then recrystallizing or purifying by column chromatography. An example of the synthetic route is as follows:

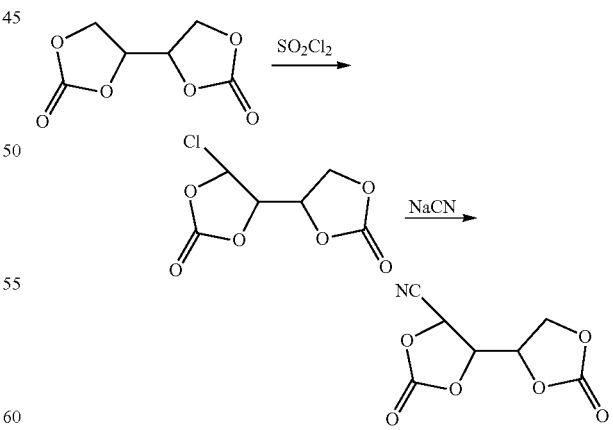

The cyano group-containing compound in compound B is prepared by: the chlorination reaction of the corresponding carbonate and sulfonyl chloride, then reacting with NaCN or KCN, and then recrystallizing or purifying by column chromatography. An example of the synthetic route is as follows:

The trimethylsilanolate-containing compound in the compound B is prepared by: the substitution reaction of the corresponding hydroxy carbonate and silazane, then crystallizing or purifying by column chromatography. An example of the synthetic route is as follows:

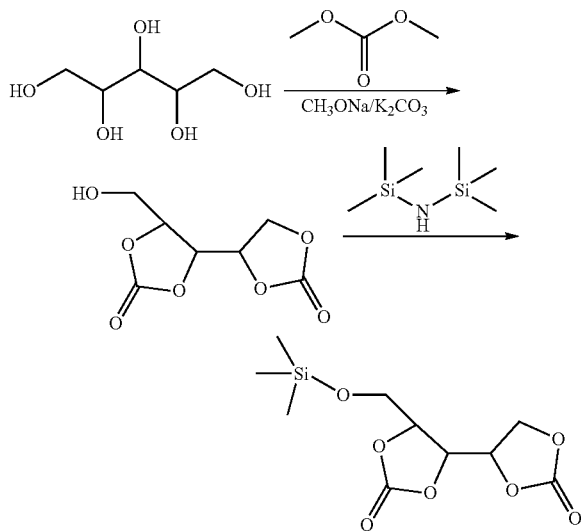

It is further preferred that the percentage mass content of the compound B is 0.1-5% based on the total mass of the non-aqueous electrolyte for lithium ion battery being 100%. When the percentage mass of the compound B is less than 0.1%, it is not conducive to forming a dense passivation film on the negative electrode and the cycle performance of the battery is reduced; When its content is more than 5%, it cannot be fully and evenly dissolved in non-aqueous electrolyte, and the film formation at the electrode interface is relatively thick, which will increase the battery impedance to a certain extent and degrade the low temperature performance of the battery.

It is understood that if the non-aqueous electrolyte for lithium ion battery contains one of the above substances, the content is the content of the one substance; If the non-aqueous electrolyte for lithium ion battery contains a plurality of the above substances, the content is the sum of the contents of the plurality of substances.

Based on the above embodiments, it is preferred that the lithium ion non-aqueous electrolyte further comprises at least one of unsaturated cyclic carbonate compounds, fluorine-substituted cyclic carbonate compounds, and sultone compounds.

Preferably, the unsaturated cyclic carbonate compound includes at least one of vinylene carbonate (VC) and vinyl ethylene carbonate (VEC). The fluorine-substituted cyclic carbonate compound includes fluoroethylene carbonate (FEC). The sultone compound is selected from at least one of 1,3-propane sultone (1,3-PS), 1,4-butane sultone (1,4-BS), and 1,3-propene sultone (PST).

The content of unsaturated cyclic carbonate compound is 0.1-5% based on the total mass of the non-aqueous electrolyte for lithium ion battery being 100%.

The content of fluorine-substituted cyclic carbonate compound is 0.1-30% based on the total mass of the non-aqueous electrolyte for lithium ion battery being 100%.

The percentage mass content of sultone compound is 0.1-5% based on the total mass of the non-aqueous electrolyte for lithium ion battery being 100%.

The non-aqueous electrolyte for lithium ion battery provided by the embodiment of the invention contains both the compound A and compound B, which can effectively improve high-temperature storage performance and cycle performance of the battery, so that the lithium ion battery containing the non-aqueous electrolyte has better cycle performance and high-temperature storage performance.

As is known to those skilled in the art, the main components in the non-aqueous electrolyte for lithium ion battery are non-aqueous organic solvents, lithium salts and additives. In the present application, compound A and compound B are additives. The content of non-aqueous organic solvent and lithium salt is conventional, and it can be adjusted accordingly after the content of the additive including compound A and compound B is determined.

Preferably, the lithium salt is selected from one or more of $LiPF_6$, $LiBF_4$, LiBOB, LiDFOB, $LiN(SO_2CF_3)_2$, $LiN(SO_2C_2F_5)_2$, $LiC(SO_2CF_3)_3$ and $LiN(SO_2F)_2$. The lithium salt content in the non-aqueous electrolyte for lithium ion battery is 0.1-15%.

Preferably, the non-aqueous electrolyte for lithium ion battery comprises a non-aqueous organic solvent, and the non-aqueous organic solvent is at least one of vinyl carbonate, propylene carbonate, butylene carbonate, dimethyl carbonate, diethyl carbonate, methyl ethyl carbonate and methyl propyl carbonate. More preferably, the non-aqueous organic solvent is a composition of vinyl carbonate, diethyl carbonate and methyl ethyl carbonate.

And, the embodiment of the invention also provides a lithium ion battery, comprising a positive electrode, a negative electrode, a separator interposed between the positive electrode and the negative electrode, and an electrolyte, wherein the electrolyte is the non-aqueous electrolyte for lithium ion battery.

Preferably, the positive electrode comprises a positive electrode active material, and the positive electrode active material is at least one of $LiNi_xCo_yMn_zL_{(1-x-y-z)}O_2$, $LiCo_{x'}L_{(1-x')}O_2$, $LiNi_{x''}L'_{y'}Mn_{(2-x''-y')}O_4$, $Li_z$ and $MPO_4$, wherein, L is at least one of Al, Sr, Mg, Ti, Ca, Zr, Zn, Si or Fe, $0 \le x \le 1$, $0 \le y \le 1$, $0 \le z \le 1$, $0 < x+y+z \le 1$, $0 < x' \le 1$, $0.3 \le x'' \le 0.6$, $0.01 \le y' \le 0.2$, L' is at least one of Co, Al, Sr, Mg, Ti, Ca, Zr, Zn, Si and Fe; $0.5 \le z' \le 1$, M is at least one of Fe, Mn and Co.

In the embodiment of the present invention, the negative electrode and the separator are not specifically limited, they can be the conventional ones in the art.

The lithium ion battery provided by the application contains the above-mentioned non-aqueous electrolyte, which enables the lithium ion battery to have both better cycle performance and high-temperature storage performance.

The following description will be made with reference to specific embodiments.

Embodiment 1

A $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 1, based on the total weight of the non-aqueous electrolyte taken as 100% by weight.

Embodiment 2

A $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 2, based on the total weight of the non-aqueous electrolyte taken as 100% by weight.

Embodiment 3

A $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 3, based on the total weight of the non-aqueous electrolyte taken as 100% by weight.

Embodiment 4

A $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 4, based on the total weight of the non-aqueous electrolyte taken as 100% by weight.

Embodiment 5

A $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 5, based on the total weight of the non-aqueous electrolyte taken as 100% by weight.

Embodiment 6

A $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 6, based on the total weight of the non-aqueous electrolyte taken as 100% by weight.

Embodiment 7

A $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 7, based on the total weight of the non-aqueous electrolyte taken as 100% by weight.

Embodiment 8

A $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 8, based on the total weight of the non-aqueous electrolyte taken as 100% by weight.

Embodiment 9

A $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 9, based on the total weight of the non-aqueous electrolyte taken as 100% by weight.

Embodiment 10

A $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 10, based on the total weight of the non-aqueous electrolyte taken as 100% by weight.

Embodiment 11

A $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 11, based on the total weight of the non-aqueous electrolyte taken as 100% by weight.

Embodiment 12

A $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 12, based on the total weight of the non-aqueous electrolyte taken as 100% by weight.

Embodiment 13

A $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of embodiment 13, based on the total weight of the non-aqueous electrolyte taken as 100% by weight.

Embodiment 14

A $LiNi_{0.8}Co_{0.15}Al_{0.05}O_2$/Si—C battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 2 of embodiment 14, based on the total weight of the non-aqueous electrolyte taken as 100% by weight.

Embodiment 15

A $LiNi_{0.8}Co_{0.15}Al_{0.05}O_2$/Si—C battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 2 of embodiment 15, based on the total weight of the non-aqueous electrolyte taken as 100% by weight.

Comparative Example 1

A $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of Comparative Example 1, based on the total weight of the non-aqueous electrolyte taken as 100% by weight.

Comparative Example 2

A $LiNi_{0.5}Co_{0.2}Mn_{0.3}O_2$/artificial graphite battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 1 of Comparative Example 2, based on the total weight of the non-aqueous electrolyte taken as 100% by weight.

Comparative Example 3

A $LiNi_{0.8}Co_{0.15}Al_{0.05}O_2$/Si—C battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 2 of Comparative Example 3, based on the total weight of the non-aqueous electrolyte taken as 100% by weight.

Comparative Example 4

A $LiNi_{0.8}Co_{0.15}Al_{0.05}O_2$/Si—C battery, comprises a positive electrode, a negative electrode, a separator interposed between the positive electrode and the negative electrode, and an electrolyte, wherein the electrolyte is a non-aqueous electrolyte and comprises the following components in percentage by mass as shown in Table 2 of Comparative Example 4, based on the total weight of the non-aqueous electrolyte taken as 100% by weight.

The Embodiments 1-15 and the $LiNi_{0.5}Co_{0.2}Mn_{0.3}O_2$/artificial graphite, $LiNi_{0.8}Co_{0.15}Al_{0.05}O_2$/Si—C batteries of Comparative Examples 1-4 of the present invention were tested for performance, and the test parameters and test methods are as follows:

(1) High-temperature cycle performance is demonstrated by testing the capacity retention rate at 1 C rate, 45° C. The specific method is as follows: at 45° C., the formed battery was charged with 1 C constant current/constant voltage to an operating voltage, the cutoff current was 0.01 C, and then discharged to 3.0V with 1 C constant current. After such charging/discharging for 500 cycles, the capacity retention after the 500th cycle was calculated to evaluate its high-temperature cycle performance.

The calculation formula of the 500th cycle capacity retention rate at 45° C. 1 C is as follows:

The 500th cycle capacity retention rate (%)=(the 500th cycle discharge capacity/the first cycle discharge capacity)*100%;

(2) Room-temperature cycle performance is demonstrated by testing the capacity retention rate after cycles at room temperature. The specific method is: at room temperature, the formed battery was charged with 1 C constant current/constant voltage to an operating voltage, the cutoff current was 0.01 C, and then discharged to 3.0V with 1 C constant current. After such charging/discharging cycles, the capacity retention rate after cycles was calculated to evaluate its room-temperature cycle performance.

The calculation formula of capacity retention rate after cycles at room temperature 1 C is as follows:

Battery capacity retention rate after cycles (%)=(the last cycle discharge capacity/the first cycle discharge capacity)*100%.

(3) Test method for capacity retention rate, capacity recovery rate and thickness expansion rate after N days of storage at 60° C.: the formed battery was charged to an operating voltage at room temperature with 1 C constant current/constant voltage, the cutoff current was 0.01 C, then discharged to 3.0V with 1 C constant current, the initial discharge capacity of the battery was measured, then charged to the operating voltage with 1 C constant current/constant voltage, the cutoff current was 0.01 C, and the initial thickness of the battery was measured. Then the battery was stored at 60° C. for N days, measured the thickness of the battery, discharged it to 3.0V with 1 C constant current, measured the capacity retention of the battery, then charged it to the operating voltage with 1 C constant current/constant voltage, the cutoff current was 0.01 C, then discharged it to 3.0V with 1 C constant current, then measured the recovery capacity. The calculation formulas for capacity retention rate and capacity recovery rate are as follows:

Battery capacity retention rate (%)=(retention capacity/initial capacity)*100%;

Battery capacity recovery rate (%)=(recovery capacity/initial capacity)*100%;

Battery thickness expansion rate (%)=(thickness after N days−initial thickness)/initial thickness*100%.

The test results of Embodiments 1-13 and Comparative Examples 1-2 are shown in Table 1 below.

TABLE 1

| | Compound A | Compound B | Other | The 800th cycle capacity retention rate at room temperature 1 C (%) | The 500th cycle capacity retention rate at 45° C. 1 C (%) | After 30 days of storage at 60° C. | | |
|---|---|---|---|---|---|---|---|---|
| | | | | | | Capacity retention rate (%) | Capacity recovery rate (%) | Thickness expansion rate (%) |
| Embodiment 1 | 2-methylmaleic anhydride: 1% | Compound 1: 1% | | 83.1 | 82.5 | 85.5 | 88.5 | 5.8 |
| Embodiment 2 | Maleic anhydride: 1% | Compound 1: 1% | | 83.0 | 82.7 | 85.1 | 88.3 | 5.5 |
| Embodiment 3 | 2-methylmaleic anhydride: 1% | Compound 3: 1% | | 82.9 | 82.3 | 85.7 | 88.8 | 5.4 |
| Embodiment 4 | 2-methylmaleic anhydride: 1% | Compound 5: 1% | | 82.4 | 82.1 | 85.6 | 89.1 | 4.9 |
| Embodiment 5 | 2-methylmaleic anhydride: 1% | Compound 1: 0.1% | | 81.5 | 80.5 | 82.7 | 86.3 | 6.1 |
| Embodiment 6 | 2-methylmaleic anhydride: 1% | Compound 1: 2% | | 84.2 | 84.7 | 87.2 | 90.8 | 4.6 |
| Embodiment 7 | 2-methylmaleic anhydride: 1% | Compound 1: 4% | | 83.9 | 84.0 | 86.7 | 90.5 | 3.9 |
| Embodiment 8 | 2-methylmaleic anhydride: 0.1% | Compound 1: 1% | | 81.1 | 80.3 | 81.7 | 85.5 | 6.9 |
| Embodiment 9 | 2-methylmaleic anhydride: 2% | Compound 1: 1% | | 82.5 | 82.0 | 84.1 | 87.7 | 5.6 |
| Embodiment 10 | 2-methylmaleic anhydride: 1% | Compound 1: 1% | Lithium bis (fluorosulfonyl) imide: 1% | 82.9 | 82.7 | 85.6 | 88.7 | 5.4 |
| Embodiment 11 | 2-methylmaleic anhydride: 1% | Compound 1: 1% | FEC: 1% | 83.7 | 83.6 | 86.1 | 89.2 | 5.1 |
| Embodiment 12 | 2-methylmaleic anhydride: 1% | Compound 1: 1% | 1,3-PS: 1% | 83.9 | 82.9 | 86.5 | 89.6 | 5.0 |
| Embodiment 13 | 2-methylmaleic anhydride: 1% | Compound 1: 1% | VC: 1% | 84.1 | 83.9 | 86.2 | 89.3 | 5.3 |
| Comparative Example 1 | 2-methylmaleic anhydride: 1% | | | 74.0 | 76.0 | 79.3 | 83.4 | 8.7 |
| Comparative Example 2 | 2-methylmaleic anhydride: 1% | | VC: 1% | 73.8 | 75.9 | 77.7 | 81.8 | 10.3 |

As is well known to those skilled in the art, the Embodiments and Comparative Examples in Table 1 and Table 2 above include conventional solvents, lithium salts and other substances in addition to the listed substances, which are not specifically described in the present application, and, in the electrolyte, the weight other than the listed above is the content of solvent and lithium salt.

Referring to Table 1, Embodiments 1-9 and Comparative Example 1 are compared. Compound A and compound B were added to the lithium ion non-aqueous electrolyte of Embodiments 1-9, and compound A was added to the lithium ion non-aqueous electrolyte of Comparative Example 1. The results show that, for the lithium ion non-aqueous electrolyte containing only compound A, the room temperature cycle performance and high temperature cycle performance of the battery are relatively low, but the high-temperature storage performance is obviously poor. However, for the lithium ion non-aqueous electrolyte containing both compound A and compound B, the room temperature cycle performance and high temperature cycle performance of the battery are improved, and the high-temperature storage performance is obviously improved as well. It can be seen that compound A and compound B can effectively improve the deficiency of high-temperature storage performance of the battery, and give the battery with excellent room temperature cycle performance, high temperature cycle performance and high-temperature storage performance.

Comparing Embodiments 10-13 and Comparative Example 2. In the lithium ion non-aqueous electrolyte of Embodiments 10-13, in addition to compound A and compound B, lithium bis (fluorosulfonyl) imide, FEC, 1,3-PS and VC were added. While in the lithium ion non-aqueous electrolyte of Comparative Example 2, only compounds A and VC were added. The results show that in comparative example 2, on the basis of adding compound A, adding VC would deteriorate the overall performance of the battery, especially the high-temperature storage performance. In Embodiment 10, on the premise that both compound A and compound B were added, the addition of lithium bis (fluorosulfonyl) imide, FEC, 1,3-PS and VC would not only not reduce the battery performance, but also slightly improve the room temperature cycle performance, high temperature cycle performance and high-temperature storage performance of the battery.

The test results of Embodiments 14-15 and Comparative Examples 3-4 are shown in Table 1 below.

TABLE 2

|  | Compound A | Compound B | Other | The 400th cycle capacity retention rate at room temperature 1 C (%) | The 200th cycle capacity retention rate at 45° C. 1 C (%) | After 14 days of storage at 60° C. | | |
|---|---|---|---|---|---|---|---|---|
|  |  |  |  |  |  | Capacity retention rate (%) | Capacity recovery rate (%) | Thickness expansion rate (%) |
| Embodiment 14 | 2-methylmaleic anhydride: 1% | Compound 1: 1% |  | 80.3 | 80.6 | 80.5 | 82.6 | 9.1 |
| Embodiment 15 | 2-methylmaleic anhydride: 1% | Compound 1: 1% | FEC: 5% | 81.8 | 81.3 | 80.4 | 82.5 | 10.0 |
| Comparative Example 3 | 2-methylmaleic anhydride: 1% |  |  | 70.2 | 72.1 | 70.3 | 74.8 | 18 |
| Comparative Example 4 | 2-methylmaleic anhydride: 1% |  | FEC: 5% | 79.4 | 71.8 | 69.5 | 73.1 | 20 |

Referring to Table 2, Embodiments 14, 15 and Comparative Examples 3, 4 are compared. Compound A and compound B were added to the lithium ion non-aqueous electrolyte of Embodiment 14. On the basis of Embodiment 14, 5% FEC was added to the lithium ion non-aqueous electrolyte of Embodiment 15. While only Compound A was added to the lithium ion non-aqueous electrolyte of Comparative Example 3. On the basis of Comparative Example 3, 5% FEC was added to the lithium ion non-aqueous electrolyte of Comparative Example 4. The results show that, for the lithium ion non-aqueous electrolyte containing only compound A, the room temperature cycle performance and high temperature cycle performance of the battery are relatively low, and the high-temperature storage performance is obviously poor. Adding FEC on the basis of compound A can improve the room temperature cycle performance and high temperature cycle performance, but the high-temperature storage performance is poor. While adding both compound A and compound B can improve the room temperature cycle performance and high temperature cycle performance of the battery. On this basis, adding a proper amount of FEC can further improve the room temperature cycle and high temperature cycle performance, as well as the high-temperature storage performance.

The above descriptions are only preferred embodiments and are not intended to limit the present invention. Any modifications, equivalent substitutions and improvements made within the spirit and principles of the present invention shall be included within the scope of protection of the present invention.

What is claimed is:

1. A non-aqueous electrolyte for a lithium ion battery, comprising a compound A represented by formula I and a compound B represented by formula II,

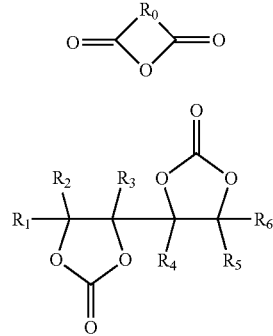

Formula I

Formula II in formula I, $R_0$ is a C2-C4 alkylene group or a C2-C4 alkenylene group, or a C2-C4 fluoroalkylene group or a C2-C4 fluoroalkenylene group;

in formula II, $R_1$, $R_2$, $R_3$, $R_4$, $R_5$ and $R_6$ are each independently selected from one of a hydrogen atom, a fluorine atom and a C1-O5 group;

the percentage mass content of the compound B is 0.1-2% based on the total mass of the non-aqueous electrolyte for a lithium ion battery being 100%.

2. The non-aqueous electrolyte for a lithium ion battery of claim 1, wherein in formula II, the C1-O5 group is selected from a C1-C5 hydrocarbon group, a halogenated hydrocarbon group, an oxygen-containing hydrocarbon group, a silicon-containing hydrocarbon group, and a cyano-substituted hydrocarbon group.

3. The non-aqueous electrolyte for a lithium ion battery of claim 1, wherein in formula II, $R_1$, $R_2$, $R_3$, $R_4$, $R_5$ and $R_6$ are each independently selected from one of a hydrogen atom, a fluorine atom, a methyl group, an ethyl group, a methoxyl group, an ethyoxyl group, a triethylsiloxy group, a cyano group or a trifluoromethyl group.

4. The non-aqueous electrolyte for a lithium ion battery of claim 1, wherein the compound B comprises one or more of compounds 1-9 represented by the following structural formulae,

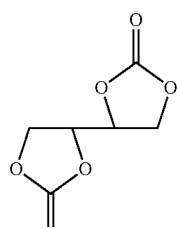

Compound 1

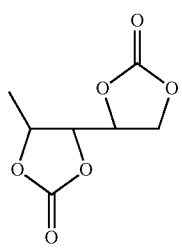

Compound 2

Compound 3
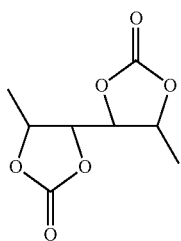

Compound 4
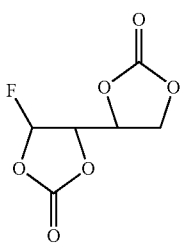

Compound 5
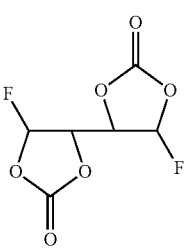

Compound 6
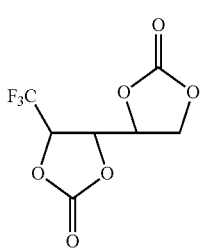

Compound 7
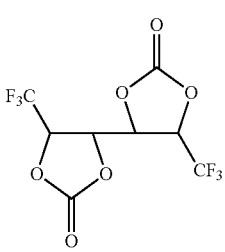

Compound 8
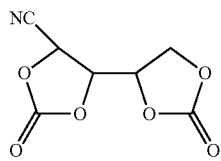

Compound 9
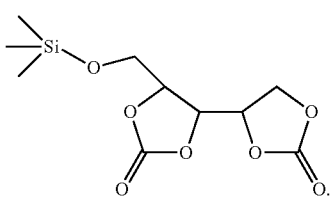

5. The non-aqueous electrolyte for a lithium ion battery of claim 1, wherein the compound A is selected from one or more of succinic anhydride, maleic anhydride, and 2-methylmaleic anhydride.

6. The non-aqueous electrolyte for a lithium ion battery of claim 1, wherein the percentage mass content of the compound A is 0.1-3% based on the total mass of the non-aqueous electrolyte for a lithium ion battery being 100%.

7. The non-aqueous electrolyte for a lithium ion battery of claim 1, wherein the non-aqueous electrolyte for a lithium ion battery further comprises at least one of an unsaturated cyclic carbonate compound, a fluorine-substituted cyclic carbonate compound, and a sultone compound.

8. The non-aqueous electrolyte for a lithium ion battery of claim 7, wherein the non-aqueous electrolyte for a lithium ion battery comprises a lithium salt selected from one or more of $LiPF_6$, $LiBF_4$, LiBOB, LiDFOB, $LiN(SO_2CF_3)_2$, $LiN(SO_2C_2F_5)_2$, $LiC(SO_2CF_3)_3$ and $LiN(SO_2F)_2$.

9. A lithium ion battery, comprising a positive electrode, a negative electrode, a separator interposed between the positive electrode and the negative electrode, and an electrolyte, wherein the electrolyte is the non-aqueous electrolyte for a lithium ion battery of claim 1.

* * * * *